Patented Dec. 28, 1948

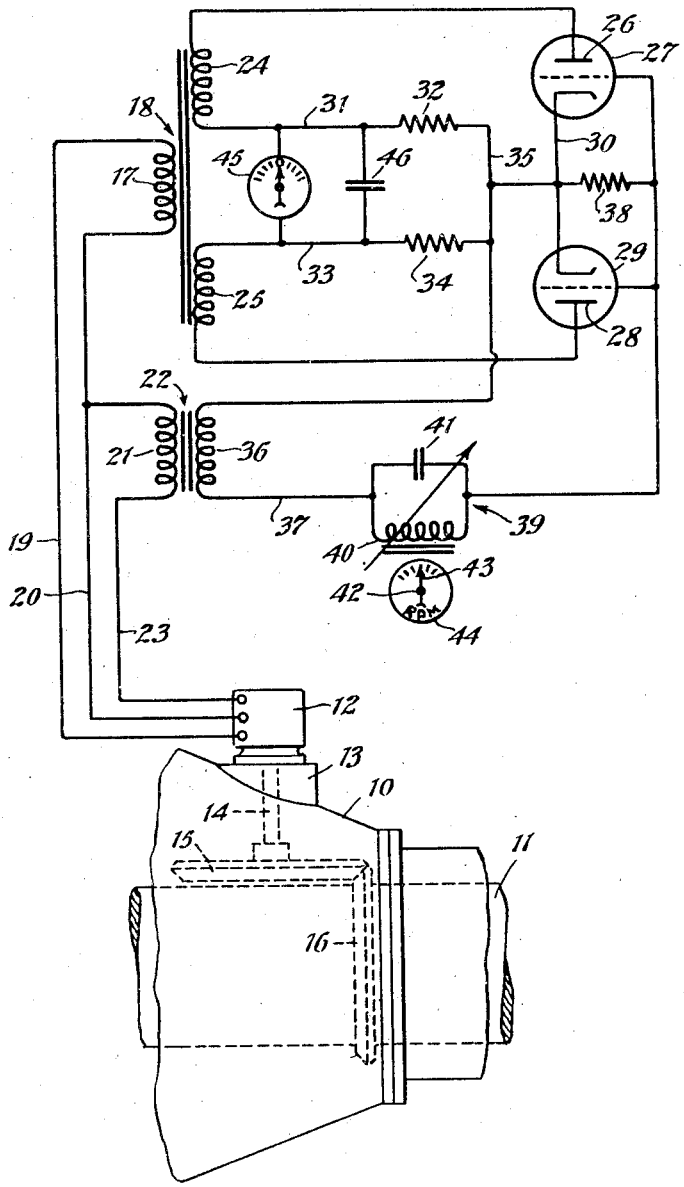

2,457,278

UNITED STATES PATENT OFFICE 2,457,278

FREQUENCY RESPONSIVE SYSTEM

Joseph R. Schoenbaum, Roseland, N. J., assignor to Curtiss-Wright Corporation, a corporation of Delaware Application May 12, 1945, Serial No. 593,524

7 Claims. (Cl. 172—245)

This invention relates to a frequency-responsive system, and more particularly to a system having a response which is characteristic of the relation of a variable frequency with respect to a predetermined frequency. Although not necessarily so limited as to such uses, the system may be availed of to particular advantage for comparing, measuring and indicating the extent to which a variable frequency may deviate with respect to a desired frequency, or in response to such a deviation, to regulate or control the operation of apparatus, being readily adaptable, for example, for automatic-frequency control, whether for broadcasting purposes or otherwise, for controlling the speed of prime movers, directly or indirectly, and, more specifically in the latter connection, for governing the pitch-control mechanisms of variable-pitch propellers of aircraft to regulate and/or synchronize the speed of the engines which are employed to drive the propellers.

One object of the invention is a system wherein provision is made for obtaining electronically a response of the character described, whereby to eliminate moving parts and in so doing minimize mechanical failure and avoid losses as a result of friction and lags due to inertia.

A further object is to provide a system wherein the response is characteristic not only of the relation of the variable frequency with respect to the predetermined frequency but also of the magnitude of the deviation.

A still further object is to provide a system which is highly sensitive and which, owing to this characteristic and the wide range of frequency deviations to which it is responsive, may be adapted with facility to widely different uses.

A still further object is a novel arrangement of the component parts of the system, whereby to attain simplicity and economy in design and facilitate and minimize assembling, testing and adjusting operations.

The single figure of the drawing is a wiring diagram of a system embodying the features of the invention.

By way of example, the system is shown in connection with an aircraft engine, the latter being sufficiently illustrated for the purpose in view by a showing of the nose section 10 and the drive shaft 11 which extends through the nose section and which is adapted to carry the propeller of the engine-propeller combination. In order to produce a signal having a frequency which corresponds to, and varies as, the speed of the engine, a two-phase generator 12 is mounted upon a pad or seat 13 which is formed, or provided, upon the nose section 10, the rotor shaft 14 of the generator carrying a gear 15 which meshes with a companion gear 16 carried by the drive shaft 11. The generator may be alnico-excited or of any other suitable type. Preferably, however, its winding are 90 degrees out of phase, and it is connected across the primary 17 of a transformer 18 by lines 19 and 20 and across the primary 21 of a transformer 22 by the line 20 and a line 23.

The transformer 18 includes two serially connected secondaries 24 and 25, one side of the former being connected to the anode 26 of an electron tube 27 while the opposite side of the secondary 25 is connected to the anode 28 of a similar tube 29, the two tubes having a common cathode line 30. The secondaries 24 and 25 are connected by a bridge, one line 31 of which includes a resistance 32 and a second line 33 of which includes a similar resistance 34, a line 35 which connects the two lines of the bridge being connected to the cathode line 30 and also leading to one side of a secondary 36 of the transformer 22. The other side of the secondary 36 is connected by a line 37 to the grids of the tubes 27 and 29 and through a resistance 38 to the cathode line 30, the line 37 including a parallel circuit 39. The inductance and capacity of the coil and condenser, 40 and 41 respectively, are predetermined so that the parallel circuit will resonate at the frequency put out by the generator 12 when the engine is turning the shaft 11 at the proper speed, the coil and condenser, either or both, being adjustable so that the parallel circuit may be tuned throughout a resonant range corresponding to the speed range of the engine. To facilitate this, the tuning control 42 may carry an indicator 43 which traverse a dial 44 calibrated directly in R. P. M.

It will be apparent from the foregoing that one phase of the generator frequency is, through the transformer 18, impressed across the anodes of the tubes 27 and 29 while the other phase of the generator frequency is utilized to bias the grids of the said tubes. The voltages which are impressed upon the anodes 26 and 28 are, therefore, 180 degrees out of phase whereas when the parallel circuit 39 is resonant, the voltage on the grid of the tube 27 leads the voltage on the anode 26 by 90 degrees while the voltage on the grid of the tube 29 lags the voltage on the anode 28 by 90 degrees. Under such circumstances the flow of current through the anode circuits of the tubes 27 and 29 will be equal, as will be the voltage across the resistances 32 and 34. Any deviation of the generator frequency, however, assuming the tuning of the parallel circuit 39 remains the same, will result in a phase shift in the parallel circuit and hence will cause an unequal phase relationship to exist between the grids of the tubes 27 and 29 and the respective anodes. The flow of current through the anode circuits of the two tubes will change accordingly, as will the the voltage across the resistances 32 and 34, the relation of the voltages across the said resistances depending upon whether the generator frequency is higher or lower than the resonant frequency of the parallel circuit and upon the magnitude of the frequency deviation.

Thus the net voltage across the lines 31 and 33 (which is zero when the generator frequency corresponds to the resonant frequency of the parallel circuit) may be caused to vary, over a predetermined range, directly as the difference between the generator frequency and the resonant frequency of the parallel circuit. Hence an indicator 45, similar to a voltmeter and calibrated in R. P. M., may be connected across the lines 31 and 33 to indicate such deviation whether it be higher or lower than the desired frequency. Preferably a condenser 46 is also connected across the lines 31 and 33 to minimize oscillatory movements of the hand of the indicator.

The linear range over which the off-speeds may be indicated is dependent upon the voltage output and power from the generator and upon the Q of the parallel circuit. When sensitivity is of more importance than the range of linearity, the said circuit should be designed for a high Q whereas if a wide linear range is of more importance than sensitivity, a parallel circuit of low Q may be employed. In this connection it is to be understood that, if desired, a series resonant circuit may be substituted for the parallel circuit for phase shifting purposes and that the voltage which is utilized to indicate the extent of speed deviation may be availed of as the energy for controlling the speed of the engine directly, or otherwise, or for controlling the operation of associated apparatus.

Though only a single embodiment of the invention has been illustrated and described, it is to be understood that the invention may be embodied in various arrangements. Various changes may be made without departing from the spirit of the invention as would be apparent to those skilled in the art and reference should, therefore, be had to the apparent claims for a definition of the limits of the invention.

What is claimed as new and desired to be secured by Letters Patent is:

1. In a frequency deviation responsive system, a multi-phase source of alternating current, the phases of which are in fixed phase relationship, an electrical device having a natural frequency, a vacuum tube bridge including two grid-containing electron tubes in two arms thereof with the plate-cathode circuit of each serially connected in its respective arm, and load impedances in the other two arms, a first circuit means for impressing the voltage of one phase of said source upon both grids of said electron tubes in unison, a second circuit means for impressing an alternating current voltage derived from another phase of said source upon each of the electron tube arms, the phase relation of said arm voltages with respect to said grid phase voltage being leading and lagging by equal angles at the source, means for including at least part of said device in series with one only of said circuit means to cause a phase shift in said one circuit means when the source frequency deviates from the natural frequency of the electrical device, means for establishing a connection between the midpoint of said load impedances and the midpoint of said tube arms, and means sensitive to and acting in response to the magnitude and direction of the average voltage drop across said load impedances.

2. In a frequency deviation responsive device, a two-phase source of alternating current, the phases of which are in fixed 90 degree phase relationship, a tuned circuit having a resonant frequency, a vacuum tube bridge including two grid-containing electron tubes in two arms thereof with the plate-cathode circuit of each serially connected in its respective arm, and load impedances in the other two arms, a first circuit means for impressing one phase of said source upon both grids of said electron tubes in unison, a second circuit means for impressing an alternating current voltage derived from the other phase of said source upon each of the electron tube arms in equal and opposite relation, means for including at least part of said tuned circuit in series with one only of said circuit means to cause a phase shift in said one circuit means when the source frequency deviates from the resonant frequency of the tuned circuit, means for establishing a connection between the midpoint of said load impedances and the midpoint of said tube arms, and means sensitive to and acting in response to the magnitude and direction of the average voltage drop across said load impedances.

3. In a frequency deviation responsive device, a multi-phase source of alternating current, the phases of which are in fixed phase relationship, a tuned circuit having a resonant frequency, a vacuum tube bridge including two electron tubes, each having a control grid, in two arms thereof with the plate-cathode circuit of each serially connected in its respective arm, and load impedances in the other two arms, circuit means for impressing the voltage of one phase of said source upon both grids of said electron tubes in unison, circuit means for impressing an alternating current voltage derived from another phase of said source upon each of the electron tube arms, the phase relation of said arm voltages with respect to said grid phase voltage being leading and lagging by equal angles at the source, means for including at least part of said tuned circuit in series with said grid circuit means to cause a phase shift in said grid circuit means when the source frequency deviates from the resonant frequency of the tuned circuit, means for establishing a connection between the midpoint of said load impedances and the midpoint of said tube arms, and means sensitive to and acting in response to the magnitude and direction of the average voltage drop across said load impedances.

4. In a frequency deviation responsive device, a two-phase source of alternating current, the phases of which are in fixed 90 degree phase relationship, a tuned circuit having a resonant frequency, a vacuum tube bridge circuit including two electron tubes, each having a control grid, in two arms thereof with the plate-cathode circuit of each serially connected in its respective arm, and load impedances in the other two arms, circuit means for impressing one phase of said source upon both grids of said electron tubes in unison, circuit means for impressing an alternating current voltage derived from the other phase of said source upon each of the electron tube arms in equal and opposite relation, means for including at least part of said tuned circuit in series with said grid circuit means to cause a phase shift in said grid circuit means when the source frequency deviates from the resonant frequency of the tuned circuit, means for establishing a connection between the midpoint of said load impedances and the midpoint of said tube arms, and means sensitive to and acting in response to the magnitude and direction of the average voltage drop across said load impedances.

5. In an apparatus for indicating the degree and direction of deviation of a source of alternating current frequency with reference to the resonant frequency of a tuned circuit comprising, a source of two-phase alternating current, the phases of which are disposed 90 degrees from each other, a transformer having two secondaries, the primary of which is connected to one phase of said source and the secondaries each being respectively connected to a pair of electron tubes each having a control grid, the plate of each tube being connected to its respective secondary, and the cathode being connected to the secondary through a load resistance, and the connections being such that the plate of one tube is substantially 180 degrees out of phase from the plate of the other tube, a transformer connected to the other phase of said source, a tuned circuit for establishing a resonant frequency, connections from said last named secondary to the cathodes of said tubes in common and to the grids of said tubes in common, at least part of said tuned circuit being interposed in series in said connections, and a direct current voltage sensitive device connected in parallel with the said load resistors, responsive to the magnitude and direction of the voltage and thereby the degree and direction of deviation of the frequency of said source from the resonant frequency of said tuned circuit.

6. In a frequency responsive system, a first source of alternating current, a second source of alternating current having the same frequency 180 degrees out of phase with the first frequency, a pair of triodes, circuit means for imposing the voltage of one of said A. C. sources on the plate of one triode, a second circuit means for imposing the voltage of the other A. C. source on the plate of the other triode, means between said two circuit means to indicate the average current therebetween, said two circuit means having a common connection to the cathodes of both said triodes; a third A. C. source having variable phase relationship with the first two, and means connecting said third source between the grids and cathodes of both triodes.

7. In a frequency responsive system, a first source of alternating current, a second source of alternating current having the same frequency 180 degrees out of phase with the first frequency, a pair of triodes, circuit means for imposing the voltage of one of said A. C. sources on the plate of one triode, a second circuit means for imposing the voltage of the other A. C. source on the plate of the other triode, means between said two circuit means to indicate the average current therebetween, said two circuit means having a common connection to the cathodes of both said triodes; a third A. C. source having variable phase relationship with the first two, means connecting said third source between the grids and cathodes of both triodes, said third A. C. source comprising an element producing alternating current in 90 degree phase relation to the first two sources and at the same frequency, and a tuned circuit operatively associated therewith to alter the phase angle of the grid impressed voltages as the frequency of said three sources varies.

JOSEPH R. SCHOENBAUM.

REFERENCES CITED

The following references are of record in the file of this patent:

UNITED STATES PATENTS

| Number | Name | Date |
|---|---|---|
| 679,175 | Lincoln | July 23, 1901 |
| 1,663,086 | Long | Mar. 20, 1928 |
| 1,708,544 | Kummerer | Apr. 9, 1929 |
| 1,762,725 | Marrison | June 10, 1930 |
| 1,787,997 | Schuchmann | Jan. 6, 1931 |
| 1,856,707 | Horton | May 3, 1932 |
| 2,153,470 | McNeil | Apr. 4, 1939 |
| 2,197,485 | Schulze | Apr. 16, 1940 |
| 2,228,090 | Smith | Jan. 7, 1941 |

OTHER REFERENCES

"Instruments", Feb. 1943, pages 60–62, article by Clark et al.